United States Patent [19]

Pressl

[11] 4,298,144
[45] Nov. 3, 1981

[54] GREASE GUN

[75] Inventor: Klaus A. Pressl, Obermichelbach, Fed. Rep. of Germany

[73] Assignee: Jakob Pressl Sohne, Nuremberg, Fed. Rep. of Germany

[21] Appl. No.: 29,121

[22] Filed: Apr. 11, 1979

[30] Foreign Application Priority Data

Apr. 12, 1978 [DE] Fed. Rep. of Germany ....... 2815699

[51] Int. Cl.$^3$ ................................................ F16N 3/12
[52] U.S. Cl. .................................... 222/256; 184/28; 184/105 A; 222/340
[58] Field of Search ...................... 222/256, 340, 387; 184/28, 45 R, 45 A, 48 R, 48 A, 105 A

[56] References Cited

U.S. PATENT DOCUMENTS

| 1,689,186 | 10/1928 | Zabriskie | 222/256 |
| 1,926,398 | 9/1933 | Nielsen | 222/387 X |
| 3,414,170 | 12/1968 | Sundholm | 222/340 |
| 4,077,494 | 3/1978 | Spaude et al. | 222/340 X |
| 4,083,428 | 4/1978 | Ness | 222/256 X |

Primary Examiner—F. J. Bartuska
Attorney, Agent, or Firm—Holman & Stern

[57] ABSTRACT

Disclosed is a grease gun comprising a tubular casing having a grease pump attachment at one end and a cover at the other end which fits internally against the casing rim. A draw rod extends into the casing through the cover and carries an internal pressure collar with a compression spring acting between the cover and the pressure collar. A small section opening is provided in the casing at the pump attachment end for the expulsion of air from the casing. The draw rod can be clamped in position with respect to the cover by a clamping device and the design of the cover is such that when the draw rod is clamped in position and then pushed inwardly of the casing, movement of the cover in the casing is facilitated.

7 Claims, 4 Drawing Figures

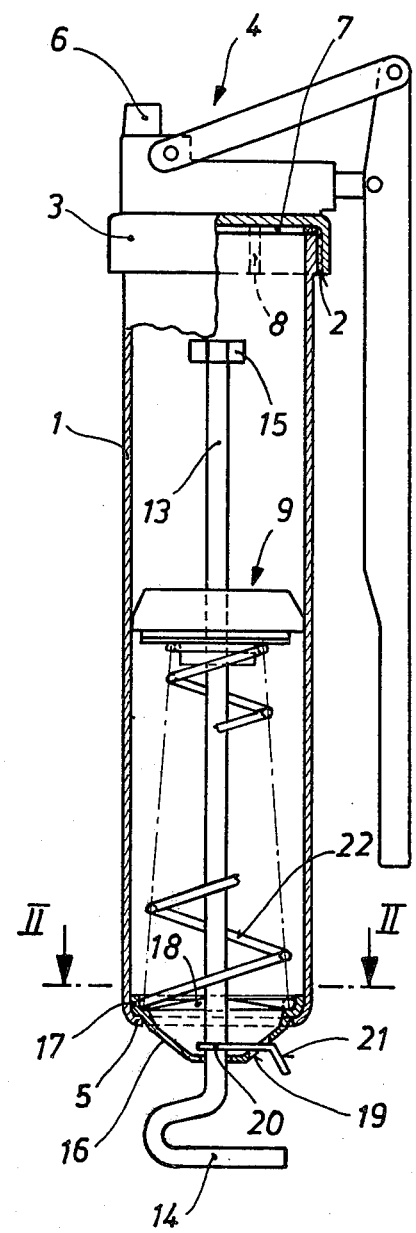
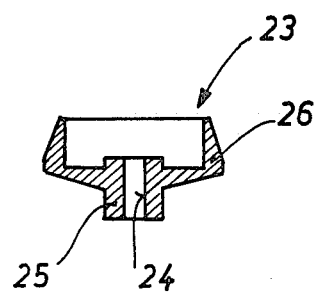
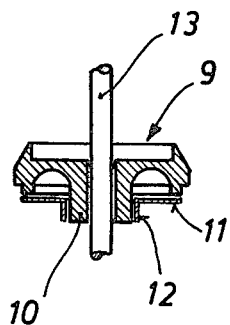
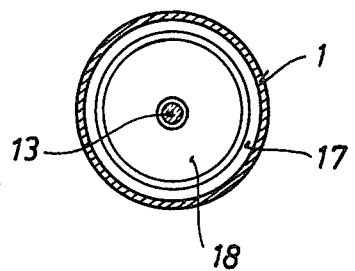

GREASE GUN

BACKGROUND OF THE INVENTION

The invention relates to a grease gun of the type having a tubular casing on one end of which fits a pump attachment and on the other end of which a cover is provided in which a draw rod extending into the casing is axially movable and fixable, a pressure collar in the casing on the draw rod and a compression spring between the pressure collar and the cover, the draw rod having a handle external to the casing.

In a known grease gun of this type, the handle whose width is greater than the diameter of the casing can be unscrewed from the draw rod and the casing can be unscrewed from the pump attachment so that the cover, the draw rod, the pressure collar and the compression spring can be extracted from and inserted into the casing through the pump attachment end. The cover has a relatively wide (about 10 millimeters) guide ring bearing on the rim of the casing from within so that it is relatively difficult to move the cover within the casing especially if the draw rod is not exactly coaxially loaded. As a draw rod fixing arrangement there is provided a keyhole-type guide hole in the cover and an annular tee-slot on the draw rod near the pressure collar.

Thus, only in its fully extended state, with the compression spring highly compressed, can the draw rod be fixed in a slanting position deviating from the center axis. When a cartridge, which contains grease and whose open end is to be guided into the pressure collar, is inserted into the casing, the insertion may present difficulties if the end of the cartridge is pinched, torn or bent. In particular, air from the sucked-in grease in the casing cannot be sufficiently removed from the grease because of the pressure of the compression spring so that, during greasing, air may be expelled instead of pure grease and this is frequently not noticed.

It is an object of the present invention to provide a grease gun where air, which may be present in the grease can be intentionally expelled from out of the casing without unduly complicating the construction of the grease gun.

SUMMARY OF THE INVENTION

A grease gun as defined by the invention is characterized by the fact that at the pump attachment end of the case there is provided a narrow air outlet opening and that the fixing arrangement for the draw rod is formed as a clamping device which has a draw rod clamping member internally of the end cover and an external operating member.

By the combination of the above two features it is possible precisely to fix the pulled-out draw rod in the axial direction and to push the collar against the grease by pressure on the draw rod so that the air present in the grease gun can escape through the air outlet opening. It has been known to make the fixing arrangement on a grease gun as a clamping device where the cover is stationary i.e., not axially movable, but it has not previously been proposed to expel air from the grease by pushing the cover into the casing as can be done with a gun in accordance with the present invention.

The term narrow air outlet opening is understood to mean an opening whose cross-section is considerably smaller than that of the grease outlet opening so that during the expulsion of air as little grease as possible exits through this air outlet opening. The most simple manner of forming the air outlet opening is to screw the casing not entirely into the pump attachment so that the air can escape through the gap between the casing tube and the attachment with the gap being closed when the attachment is screwed home.

It is especially expedient if the air outlet opening can be closed so that it has no effect during actual greasing.

In a grease gun where the casing is screwed into the attachment against a packing ring, it is expedient if a groove running in the axial direction is provided in the thread to form the air outlet opening. By a simple means there is thus created a well functioning air outlet which is open when the casing is loosened slightly or insignificantly with respect to the pump attachment and which is closed by tightening the casing onto the packing ring.

It is also expedient if the operating part of the clamping device is located in a radial direction inside the circumference of the opening of the casing and forms a side bar bent over slightly in the axial direction. With this arrangement, the operating part together with the cover can be pushed easily into the casing tube with the operating part being easily and nevertheless efficiently operable.

It is also expedient if the width of the cover guide ring is reduced compared with known such rings. The width may be such that the guiding function is accomplished but that any tightness and any sticking of the cover is substantially avoided during movement of the cover in the casing. Preferably the width of the guide ring is less than 10 millimeters, for example about 7 millimeters. The proportion of the outside diameter of the cover to the width of the guide ring is preferably 6.5 to 8.5 to 1, particularly from 7 to 8 to 1, and especially 7.4 to 1.

Further, it is preferred to provide the cover internally with a disc on which the compression spring acts. The inserted disc prevents unsymmetrical loading of the cover by the compression spring and thus canting of the cover which is undesirable because of the mobility of the cover in the casing which may possibly occur with a reduced thickness guide ring. It is also expedient if the compression spring is helical and tapers conically from the cover to the pressure collar. This conical design of the compression spring facilitates the axial compression of the spring in the casing and allows also simplified guiding or adjustment of the spring end on the pressure collar. Canting of the pressure collar is substantially avoided because of the small diameter of the spring end bearing on the pressure collar.

Furthermore, the pressure collar preferably has a depending boss tightly surrounding the draw rod. This contributes considerably to the elimination of canting of the pressure collar in the casing tube. The helical compression spring with respect to the attachment has in a radial direction less play relative to the draw rod and especially with the conical design of the compression spring this contributes to the elimination of canting of the pressure collar.

If a disc forming a bearing for the compression spring bears on the pressure collar, it is here expedient if this disc forms a neck encircling the collar boss. This neck stabilizes the collar and improves the holding and guiding of the compression spring.

The design of a grease gun as defined in the invention is especially favorable if a grease cartridge is used, especially if its free edge deviates from a precise circle. The draw rod is then pulled out and clamped tight. Now the pressure collar can be moved circularly back and forth since the inside cover can be rotated somewhat in similar manner to a ball joint. Because of the relatively thin guide ring of the cover, its rotatability is considerably improved. The pressure collar is also guided in a better manner on the draw rod whereby the insertion of the collar into the cartridge is facilitated by allowing the collar to circle or by feeling with the collar.

There is preferably provided a form of collar which facilitates insertion of the collar into a cartridge. This entails elastic compressibility of the collar in a radial direction. Further, the pressure collar preferably tapers conically towards the pump attachment. It is also possible however to provide the casing, near the pump attachment, with a necked-down portion in which the collar is compressed in a radial direction so that it can be pushed into the cartridge.

A grease gun as defined in the invention is of advantage if, during operation, the pressure collar should jam in the casing so that during the greasing air comes out in place of grease. Then, the draw rod can be pulled out somewhat and clamped tight and then be pushed in together with the cover whereby, because of the increasingly compressed compression spring between the inside cover and the collar, the latter is also moved. Thus, if the normal pressure of the compression spring on the pressure collar is not sufficient to move the collar forward in the casing, the pressure can be increased by moving the inside cover and by increased compression of the compression spring.

The assembling and dismantling of the parts attached in the casing can be simplified if the width of the handle is in a radial direction within the circumference of the opening of the casing. Collar, draw rod, compression spring, cover and handle can then be taken out of the casing and re-inserted as a unit.

DESCRIPTION OF DRAWINGS

FIG. 1 is a longitudinal section through a grease gun.
FIG. 2 is a cross-section along line II—II in FIG. 1.
FIG. 3 is a section through the collar of the grease gun according to FIG. 1.
FIG. 4 is a section through an alternative form of collar.

DESCRIPTION OF PREFERRED EMBODIMENT

A grease gun according to the drawing has a tubular casing 1 which has on top an exterior rolled round thread 2 onto which an attachment 3 is screwed which carries a pump 4. The casing bottom has a slightly turned in rim 5 so that the cross-section of the lower opening is smaller than the cross-section of the casing generally. On the attachment 3, a grease outlet opening 6 is provided associated with the pump 4. The casing 1 is screwed into the attachment 3 against a packing ring 7. The inner thread of the attachment 3 is cut away along a groove 8 running in the axial direction so that air can escape from the casing tube 1 through the groove when the casing is not entirely screwed into attachment 3.

Within casing 1 there is provided an axially movable rubber collar 9, the profile of which tapers conically towards the attachment 3. The collar is somewhat elastically compressible in the radial direction because of its material and shape which is known per se and which is shown in cross-section in FIG. 3. The collar has a depending neck-like boss 10 enclosed by a metal disc 11 which forms a neck enclosing the boss and the collar 9 is movable with disc 11 on a draw rod 13 which runs along the casing 1, protrudes from the lower end and terminates in a bent handle 14 integral with the draw rod and which in a radial direction is small enough to fit through the opening formed by the turned-in rim 5. The draw rod 13 has on its upper end nut 15 or like end restraint.

In the region of the turned-in rim 5 there is provided in the casing 1 an internally mounted cover 16 which bears on the turned-in rim 5 from the inside by means of a circular edge strip and the cover in this position having a portion which projects from the casing. On the outside, the edge strip is provided with a narrow guide ring 17 which bears on the inside wall of the casing. In the region of the guide ring 17 there is inserted in the cover 16 a metal disc 18 which bears on the circular edge strip of the cover and towards the center protrudes somewhat towards the collar 9. In the outwardly extending section of the cover 16 there is provided an opening 19 through which a side bar including a clamping piece 20 extends and which has a bore, not shown, through which the draw rod 13 protrudes. The side bar has an external operating part 21 which is bent towards the handle 14 and forms a clamping arrangement by means of which the draw rod can be fixed in any position in relation to the cover 16. A helical compression spring 22 extends from the disc 18 of the cover 16 to the disc 11 of the pressure collar 9, the diameter of the spring decreasing towards the collar and the spring being guided in a radial direction on the one hand by the protruding form of disc 18 and on the other hand by the neck 12. The draw rod can be clamped in position relative to the cover 16 by means of the clamping arrangement and by pushing against handle 14, cover 16 can then be caused to move in the casing thereby moving the collar 9 and/or compressing the spring 22.

FIG. 4 shows in cross-section a rubber collar 23 which is constructed differently from the collar 9 shown in FIG. 3 and which can also be used in the grease gun according to FIG. 1. The collar 23 is provided with a bore 24 extending in an axial direction through which the draw rod 13 is inserted and a downwardly extending neck-shaped boss 25 merging with a cup-like member 26 having an outer profile which is conically tapered towards the top. This rubber collar 23 is also somewhat resiliently compressible in the radial direction.

While only a single preferred embodiment of the invention has been described in detail, it will be appreciated that numerous modifications are possible within the scope of the invention as defined in the appended claims.

What is claimed is:

1. A grease gun comprising a tubular casing; a pump attachment for one end of the casing; a cover mounted internally at the other end of the casing, engaging a turned-in rim portion thereof, said cover having a section for projecting from said other end of the casing and being axially movable within the casing, said cover further being provided with an outer guide ring section fitting internally on said turned-in rim portion, the ratio of the outer diameter of said cover to the width of said outer guide ring section being about 6.5 to 8.5; a draw rod axially slidably disposed in said casing, said draw rod extending through said projecting part of said cover and terminating in a handle; a pressure collar encircling said draw rod within said casing; a disc within said outer guide ring section; a compression spring means within said casing operating between said collar and said disc; a selectively openable and closeable means for providing for escape of air from within said casing at said one end of said casing; and means for fixing the axial position of said draw rod relative to said cover comprising clamping means for said draw rod internally of said cover and operating means for said clamping means externally of said cover, said operating means comprising a substantially radially extending operating member of smaller radial extent than the width of said casing.

2. The grease gun as defined in claim 1, wherein said one end of said casing has a screw thread for screwing into said attachment against a packing ring and said means for providing for escape of air comprises an axially extending groove formed in said thread.

3. The grease gun as defined in claim 1, wherein said compression spring means is a helical spring tapering conically from said cover towards said collar.

4. The grease gun as defined in claim 1, wherein said collar includes a depending boss section tightly encircling said draw rod.

5. The grease gun as defined in claim 4, including a disc forming a bearing for the compression spring means on said collar, said disc forming a bearing including a portion encircling said boss section.

6. The grease gun as defined in claim 1, wherein the handle has a length in a radial direction which is within the circumference of said other end of the casing.

7. The grease gun as defined in claim 1, wherein the ratio of the outer diameter of said cover to the width of said outer guide ring section is 7.4

* * * * *